June 4, 1968 R. COUTURE 3,386,217
STATIC MODULAR VENTILATING UNIT
Filed April 9, 1965 3 Sheets-Sheet 1

Robert Couture
Inventor

By Wenderoth, Lind & Ponack
Attorneys

June 4, 1968 R. COUTURE 3,386,217
STATIC MODULAR VENTILATING UNIT
Filed April 9, 1965 3 Sheets-Sheet 2

Robert Couture, Inventor
By Wenderoth, Lind & Ponack
Attys

United States Patent Office 3,386,217
Patented June 4, 1968

3,386,217
STATIC MODULAR VENTILATING UNIT
Robert Couture, 31 Rue Berteaux,
63 Clermont, Ferrand, France
Filed Apr. 9, 1965, Ser. No. 446,862
6 Claims. (Cl. 52—303)

ABSTRACT OF THE DISCLOSURE

A constructional unit for cooling a building constructed of such units. The exterior shape of the unit is substantially parallepiped and has an inner opening with a rectangular face open to the sky. The interior of the building communicates with the exterior through such opening. Associated with such opening are means whereby heat radiation may take place towards the exterior. Screens with reflector surfaces are provided associated with such opening to prevent receiving radiation from the exterior other than that emitted from the sky and diffused by the atmosphere. One of the screens is provided with a parabolic reflector surface and other screens have lateral reflector surfaces to protect the opening from the morning and afternoon sun. The sun's rays are turned back towards the exterior by the reflector surfaces.

This invention relates to a fixed building unit, forming the whole or part of a south or north wall, its purpose being to cool a building by protecting it from the sun and from ground reflections, while allowing it to radiate heat to the sky. The building unit has an aperture opening outwards, placed below a parabolic reflecting surface, which receives only the rays emitted within a dihedral angle bounding a portion of the sky, vertical side reflecting walls preventing the sunshine, while it comes from within this dihedral angle, from passing through the said aperture.

According to one aspect of the invention, the parabolic reflecting surface bounding the aperture above and to the rear is generated by a straight line at right angles to the meridian plane as it moves through a parabolic segment lying in the meridian plane and having as its axis the intersection of the meridian plane with a perpendicular plane.

According to another feature of the invention, the said aperture is bounded on each side, towards the front, by a vertical plane lying at a well defined angle to the meridian plane, according to the geographical location of the building unit, and, towards the rear, by a plane parallel to the meridian plane.

According to a further feature of the invention, the aperture is bounded, below, by a surface which is itself bounded rearwards by a straight line at right angles to the meridian plane.

Figure 1:
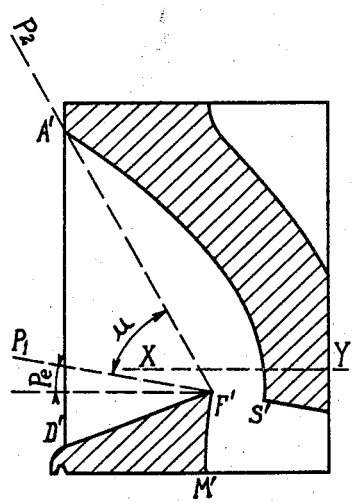
Figure 2:
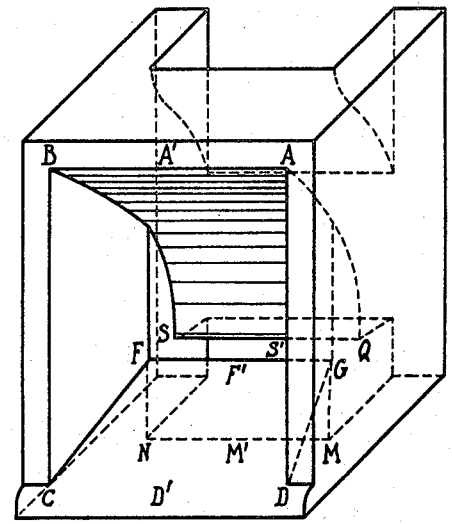
Figure 3:
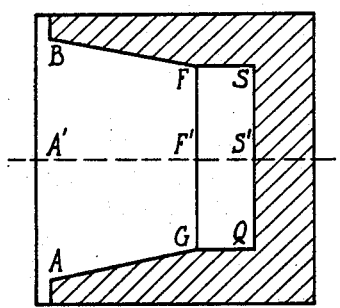

A description of the various embodiments of the invention will now follow, in conjunction with the accompanying drawings, in which:

FIGURES 1, 2 and 3, show one part of the aperture, designed for use at the equator, and are, respectively, a vertical section in the plane of symmetry, a perspective drawing and a section in a horizontal plane.

Figure 4:
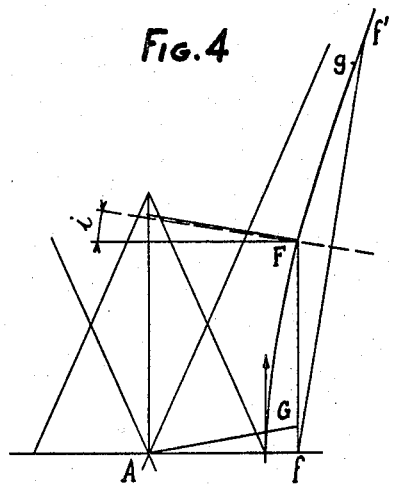
Figure 5:
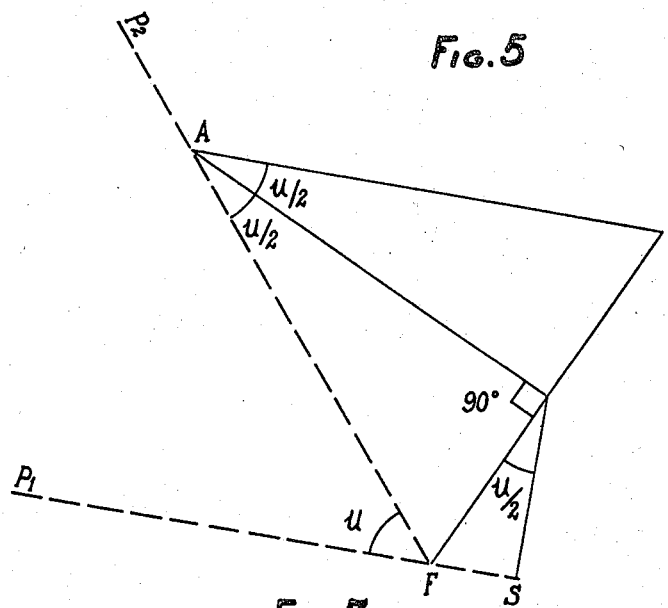
Figure 7:
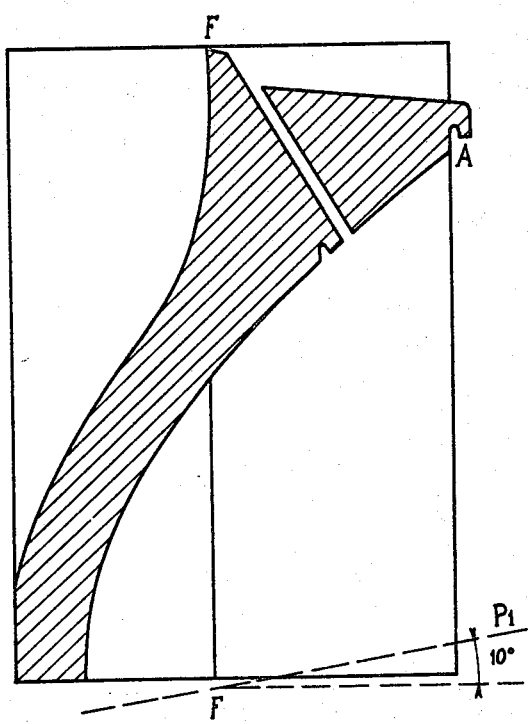
Figure 6:
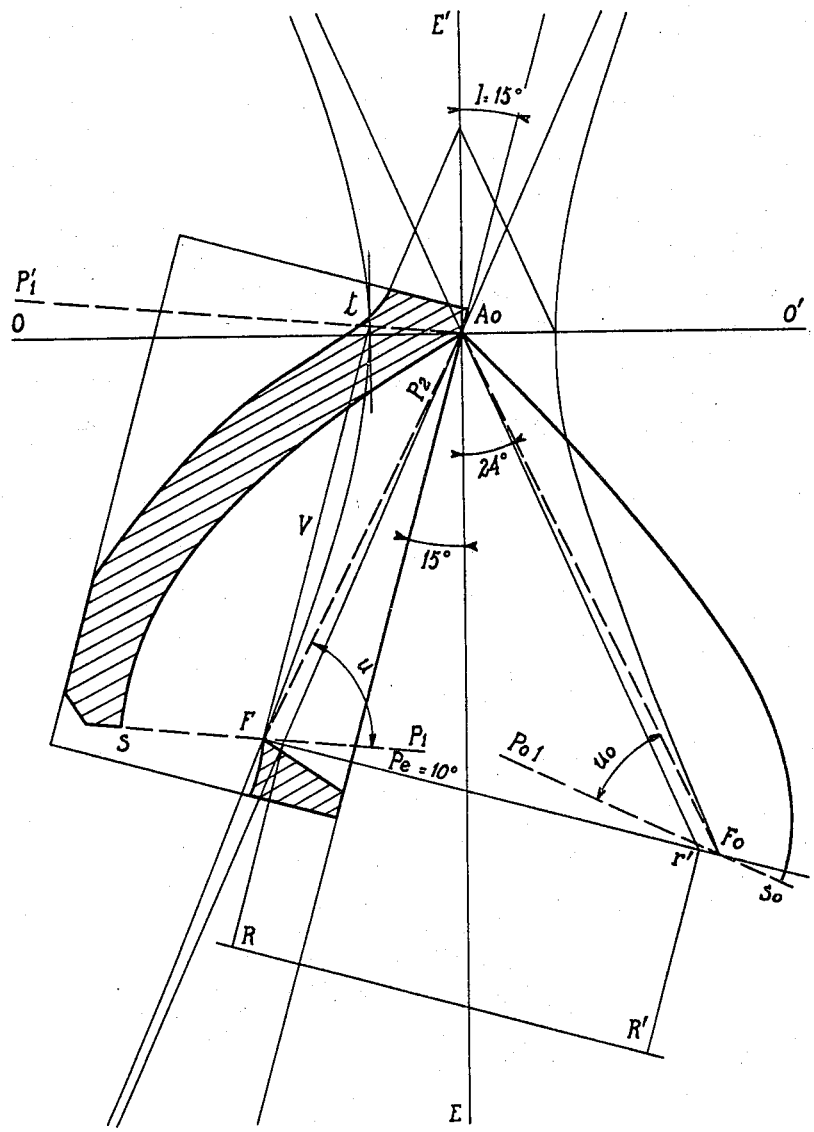

FIGURES 4, 5 and 6 serve to illustrate the determination of various geometrical parameters concerned in the construction of the building unit to which the invention relates; and FIGURE 7 shows a building unit in section.

To simplify description, only building units intended for use in the northern hemisphere are considered here. The same units, placed symmetrically in relation to the equatorial plane, can be used similarly in the southern hemisphere.

*Description of a unit designed for use at the equator*

The unit shown in the form of a vertical section in the plane of symmetry in FIGURE 1, of a perspective drawing in FIGURE 2 and of a horizontal section in FIGURE 3 is designed for use at the equator. The plane of the vertical section is a terrestrial meridian plane and $A'D'$ is a vertical. To the south, the unit has an aperture opening outwards.

Above and rearwards, this aperture is bounded by the parabolic surface generated by a straight line at right angles to the meridian plane in moving through segment $A'S'$ of a parabola. The latter, which lies in the meridian plane, passes through $A'$, has $F'$ as its focus and as its axis the intersection of the meridian plane and a plane at right angles, P1. The plane P1, in the case of FIGURES 1, 2 and 3, rises towards the south and makes an angle of 10° with a horizontal plane. The apex of the parabola is designated $S'$.

The aperture opening outwards is bounded on each side, towards the front, by a vertical plane at an angle $i$ (equal to 10°, in the case of FIGURES 1, 2 and 3) to the meridian plane and, towards the rear, by a plane parallel to the meridian plane. These two planes intersect at F and G.

Downwards, the aperture is bounded by a surface which is bounded at the rear by straight line $GFF'$ at right angles to the meridian plane. The surface must lie below plane P1. In the case of FIGURES 1, 2 and 3, it is an inclined plane.

P2 is a plane perpendicular to the meridian plane and passing through $A'$ and $F'$. The straight lines $AA'B$ and $GF'F$ are horizontals in this plane.

$FF'GQS'S$ is a rectangular opening known as a window.

$FF'GMM'N$ is a reflecting surface situated below $FF'G$ and so designed that any ray coming from the parabolic surface is not reflected back to that surface, but is directed towards the interior of the building. The surface $FF'GMM'N$ may be so designed, for example, as to reflect through the window whatever radiation it receives from a certain part of the building—the hottest or most frequented part, for example, or that which contains the object that is to be cooled.

*Mode of operation of the unit described*

The parabolic surface and side walls of the aperture are reflecting surfaces. The inclined plane by which this aperture is bounded below may also be a reflecting surface.

If the straight lines $AA'B$ and $QS'S$, by which the parabolic surface is bounded, and straight line $GF'F$ be imagined as produced indefinitely at each end, any ray emanating from a distant point contained within the dihedral angle P1–P2, and cutting P2 between $AA'B$ and $GF'F$ will pass through the window. Let this ray be thought of, in fact, as produced into the meridian plane; it will pass between $F'$ and $S'$, directly or after reflection by parabolic segment $A'S'$. On the other hand, a ray emanating from a point outside the dihedral angle will certainly not pass through the window.

The dihedral angle, as shown in FIGURE 1, opens southwards, towards the sky. For part of the morning and part of the evening, the sun stands within this dihedral angle, over a period of six months, which includes the winter solstice. The purpose of the vertical planes being at an angle $i$ of 10° to the meridian plane is to return the sun's rays outwards, after one or more reflections, in all cases, including more particularly the most unfavourable case, at the winter solstice.

The building is thus protected against ground reflection and the sun and exposed to radiation from part of the cold sky and from whatever clouds may lie between the building unit and that part of the sky, which are at a temperature below ground surface temperature. The effect aimed at, namely the cooling of the building in relation to the outside, is thus achieved.

The interior of the building, however, is heated by:

The diffused portion of the solar radiation received by the clouds;

The diffused portion of the ground reflection received by the clouds;

Part of the radiation emitted by the sides of the aperture, which in practice are not perfect reflectors;

The radiation diffused by the said sides, which are not perfectly smooth, either, and which receive ground reflection and, at certain moments, sunshine;

The heat transmitted by conduction through the unit; and

The heat carried by the air through the window.

*Determination of various geometrical parameters*

The shadow of a point A is traced on a horizontal plane at the winter solstice, when the direction of the sun makes an angle of 24° with the equatorial plane (instead of the true 23°27′, to take account of the apparent radius of the sun). During the day, the sun's rays passing through A describe a cone having a half-angle of 90° —24° at the apex. As the building unit is situated at the equator, the axis of this cone is horizontal and the shadow of point A on a horizontal plane is a hyperbola having as its asymptotes two straight lines enclosing an angle of 2 (90°—24°) and intersecting at the foot of the perpendicular dropped from A on to this plane. A point F is chosen on the hyperbola and a vertical plane is passed through this point. The shadow of A, after reflection at this plane, describes a hyperbola symmetrical with the first in relation to this plane. The angle $i$ between this plane and the meridian plane is so determined that, after reflection, the shadow of A is no further from the front of the building than is point F, that is to say that it does not enter the window. To determine the minimum value for $i$, take point $f$, at the foot of the perpendicular dropped from F on to the axis of the hyperbola. The vertical plane, for $i$ minimum, is the median plane of $ff'$, $f'$ being the farthest point of the hyperbola from $f$ and at a distance $\overline{Ff}$ from F. Strictly speaking, to obtain the minimum value for $i$, one should take not point $f$, but point G and point $g$ of the hyperbola situated at a distance of $\overline{FG}$ from F. FIGURE 4 shows that this minimum angle $i$, in the case of FIGURES 1, 2 and 3, is approximately 10°.

The choice of point F, the vertical plane and the predetermined slope of plane P1 determine the shape of the member. The parabola is then constructed and the plane symmetrical to the vertical plane in relation to a meridian plane is caused to pass through A.

*Choice of point F*

The window behaves like the surface of a perfectly black body having the same temperature as that of the interior of the building. The radiation it emits is proportional to its surface area. This should be made as large as possible in relation to the frontal area occupied by the unit. Two sides of the rectangular window are represented by the distance from the focus F of the hyperbola to its apex S. FIGURE 5 shows that $\overline{FS} = \overline{AF} \sin^2 u/2$. Thus, angle $u$ between planes P1 and P2 must be as large as possible.

Moreover, the amount of radiation emitted by the side walls of the aperture and received by the window increases with the solid angle through which the walls are seen from the window. This solid angle diminishes as F approaches the front.

Hence, to increase the radiation emitted by the building through the window and to reduce the radiation received, one is led to bring F as near as possible to the front, to the extent that, in certain cases, it may be advantageous to allow the sun's rays to enter through the window at certain times during a certain period of the year, to bring F nearer to the front.

It may be desirable, for example, from 15° northern latitude on, to allow the midday sun's rays to enter the windows of units facing south for a period of 2J days in the year, including the winter solstice. To predetermine the characteristics of such a unit, the hyperbola described by the shadow of a point is traced on a meridian plane on the Jth day before or after the winter solstice. The angle between the sun and the equatorial plane on that day is 23°27′ sin (90—J) degrees and this hyperbola is made use of in the way in which the hyperbola representing the shadow of a point on a meridian plane at the solstices is used in what follows.

When facing north, from the 15th degree of northern latitude onward, it may be found desirable, again so as to bring point F near to the front, to allow the sunshine to enter the window in the early morning and late afternoon.

In high latitudes, F can be brought near the front and $u$ can be increased by inclining a north front by an angle I$n$ towards the south, without changing the slope of P1. The geometrical characteristics of such a unit are those of a unit placed vertically at latitude $l$—I$n$ with a a plane P1 sloped at an angle of $Pe$—I$n$.

*Design for a unit to be used in latitude $l$ in a wall having either a southern or a northern aspect*

The hyperbola to be considered is that of the track, on a meridian plane, of the solar shadow of a point A at the solstices. In the case of FIGURE 6, A is 40 cm. from the meridian plane, the plane of the figure. A$o$ is the foot of the perpendicular dropped from A onto this plane. The straight line OA$o$O′ is parallel to the axis of the poles and the straight line EA$o$E′ is at right angles to it. The hyperbola is completely defined by its apices situated in OO′ at a distance of 40 cm. sin 24° from A$o$ and by its asymptotes intersecting at A$o$ and forming an angle of 24° with EE′.

It is desired to design a unit for use in 15° northern latitude in a face exposed to the north. For this, one considers the left-hand member of the hyperbola in FIGURE 6. The plane P′1, parallel to P1 and passing through A$o$, cuts the hyperbola at point $t$. Through this point a vertical, $v$, is drawn, which makes an angle of 15°, equal to the latitude of the locality, with EE′. It cuts the hyperbola at a second point, which is taken as the point F of the unit. The parabola of which SA$o$ is a segment is drawn using F as the focus and the intersection of P1 and the meridian plane as the axis.

It will be seen that in the case considered—15° northern latitude and northern aspect—the angle $u$ is large and so is the width, SF, of the window.

RF is a hyperbolic segment representing the track of the solar shadow of A on the horizontal plane passing through F. This plane has been brought down into the plane of the figure. The horizontal hyperbola is defined by its point F and by its apices R and R′, traced by two generators of the cone which the sun appears to describe from A. These two generators are those lying in the terrestrial meridian plane passing through A. We also know the asymptotes of the hyperbola of the horizonal plane; they cut each other at the center of RR′ and are parallel to the horizontal generators of the cone which the sun appears to describe. The hyperbola representing the track of the shadow of A on the horizontal plane in question enables the angle $i$ to be determined.

We have thus arrived at a unit approximately twice as high as it is wide. However, subject always to the sun not being allowed to enter the window, we could have chosen F from the section of line F$t$ in the figure. Angle $u$ would be slightly smaller. By taking F from the hyperbola of the meridian plane, at a point situated below the point F in the figure, we should be a higher unit and $u$ would be a trifle larger. The limit value of $u$ as F recedes on the hyperbola member is $(90°-24°)-(Pe-l)$.

If F were taken from arc F$t$ of the hyperbola, a little sun would pass through the window, morning and evening, during a period including the summer solstices, but the window would still be protected at all times from the midday sun.

It will thus be seen that one has a great deal of latitude in one's choice of F and in the relative dimensions of the unit.

To arrive at a unit which can be inserted in a wall facing south in 15° northern latitude, one takes the right-hand member of the hyperbola discussed above in the meridian plane. Point F may be any point in this hyperbola, such as, for instance, point F$o$, symmetrical with point F in relation to the meridian line of RR' in the figure. If a parabola be constructed to pass through A$o$, using F$o$ as the focus and line P$ol$ sloping 10° as the axis, it will be found that the window is small in comparison with the height and depth of the unit. A unit placed in a south-facing wall in latitude 15° is thus not very effective. To increase the area of the window, one may consider allowing the midday sun to enter round about the winter solstice, that is to say during the season of least heat.

If the sun is never to be allowed to enter the window, this will become narrower and narrower with increasing latitude, becoming nonexistent in a latitude of $$(90°-24°)-Pe$$

It is true that the unit loses some of its attractions in that latitude.

PUTTING THE INVENTION INTO PRACTICE (1) *Production of units for assembly to form a wall*

The production of a building unit such as is illustrated in FIGURE 2 is not impossible. In fact, for units which it is proposed to assemble to form a wall, each unit is sectioned in a horizontal plane, a little above FF'G; that portion of the parabolic middle part which lies below this plane is omitted; then the rest of what is below is transferred to the top of the unit. This produces a shape that is more easily made. Allowance is made for the thickness of the joint between two units.

To avoid heat transference by conduction, from outside to inside, the unit is made of a material having low thermal conductivity, such as: brick, cellular terra-cotta, expanded pumice or slag concrete, voidy expanded pumice or slag concrete, vermiculite concrete, perlite concrete, cellular concrete, agglomerated vegetable particles and fibres, bonded woods, compressed cork, expanded polystyrene and the foamed forms of polyester, polyurethane, urea formaldehyde, glass and so forth.

A reflecting paint, such as aluminum paint, for example, should be applied over a priming coat to the exterior and, more particularly, to the parabolic surface and the side walls. This paint work must be glossy. A reflecting paint is also advisable inside.

To give a view of the outside from inside, the lower portion of the parabolic middle part may again be omitted. This omitted portion may be, for example, that which lies below a plane parallel to the inclined plane FCDG and passing above FG. Thus, a transparent panel may be fitted, sliding in sloping grooves passing above F and G, extending above the inclined plane and provided with an end stop. Closure may also be effected by means of a panel pivoted about FG.

The aperture may be closed by a fixed plate of glass or transparent plastics—polyethylene, for instance—transparent to infra-red rays.

These panels and plates may be frosted or otherwise obscured, preferably on the inner side.

The aperture may be decorated with a fine meshwork, but the surface of the wire must be non-reflecting.

When assembled, the units can form a wall; they may be placed directly against a wall or at a certain distance in front of a wall. The inner wall is then cooled and acts as a thermally inert barrier.

Units comprising a large number of very small units can be made, especially in cases where they are intended to be placed against a wall. The hollows situated between the wall and the units can be filled with heat-conductive material (compact cement mortar, for example), which is thermally connected to the wall it is desired to cool. The outer face of this material may be an extension of the ramp CFGD (FIGURE 2). If it does not naturally absorb infra-red radiation, it must be coated with a paint which does. Titanium oxide paint is suitable. Such paint not only absorbs infra-red rays, but also reflects visible radiation.

(2) *Production of large units*

For large units, the isothermal properties of the materials are of less importance than for small ones. The vertical parts may be an ordinary wall. The parabolic portion, however, needs to be made of poorly conductive material, such as isothermal concrete, for example, which may be reinforced. It can be made of wood. It can be a panel of insulating material, or of non-insulating material faced with insulating material.

The vertical members situated behind the parabolic portion may be dispensed with.

The undercoating and reflecting paint are applied in the same way as to the small units. The parabolic face and the sides of the aperture may be made advantageously from sheets of polished aluminium, with a small gap left between them and the body of the unit. The air circulating within this gap prevents overheating of the sheeting and the body of the unit.

As with the small units, the lower part of the parabolic member may be omitted. The window may be closed with a fixed plate or movable panel. There is no reason why an opaque panel should not be used; this may consist of a transparent panel coated with emissive black paint on the underside.

The height of FF'G in relation to the ground does not matter, so long as it is above ground. Just in front of FF'G there may be a low curb, its top level with FF'G, before which the ground may be horizontal or sloping and might well be improved in appearance by the addition of a lawn, for example.

(3) *Considerations affecting the production of the units*

A slot or holes may be provided, passing through the upper part of that portion of the unit which has the parabolic surface. These are intended to cool the unit by natural convection, particularly when the sun is falling on it, and to reduce its thermal conductivity.

FIGURE 7 is a section, in the plane of symmetry, of a unit made of brick, which is intended to form part of a group of superimposed units, these being of predetermined shape for use in a north wall in 5°30' northern latitude. A slot, sloping steeply down towards the front, passes through the upper part of the main body of the unit and may extend right across its width. The slot may be rectangular in section or have its corners rounded and it may widen downwards to avoid the jamming of such solid bodies as may enter the slot. The forward and downward slope of the slot is intended to carry off any water it receives. The ramp situated in front of the top opening of the slot may be slightly sloped outwards, so that water may run off, and may extend beyond the front face of the unit, so that a water-drip may be provided in the form of a horizontal groove at the top of the parabolic surface.

A beading to the rear of the ramp, between the top opening of the slot and point F, prevents rain-water driven by the wind from entering the window.

To prevent water passing through the slot from running down the parabolic surface, a second horizontal groove is made in this surface, below the bottom opening of the slot, to form a second water-drip.

This water-drip can similarly be produced by using as the directrix of the parabolic surface two arcs of two parabolas: the one arc, situated in front of the water-drip, would still belong to the parabola passing through A; the other would belong to a parabola having the same focus F and the same axis P1, but passing through the base of the groove.

The slot may be replaced by a number of holes spaced along a line perpendicular to the plane of symmetry of the unit, with their axes parallel to the line of maximum slope of the slot.

Certain walls of the unit must have properties of reflection. They can be given these by means of sheet material having a reflecting surface. This is secured to the walls by adhesives or by plugging and screwing or nailing, or in any other conventional manner.

The sheets of reflecting material may be either plain sheets of metal, such as polished aluminium or aluminium with an anodised surface, or sheets composed of a metal foil stuck to a support such as, for example, a sheet of waterproofed paper or cardboard.

*That member of the unit which has the parabolic surface may consist wholly or partly of a transparent plate,* to enable more light to enter the building and to enable the occupants to see out.

In that case, the radiation from outside impinging on the parabolic surface will be divided into one transmitted, one absorbed and one reflected portion. One of the purposes of the unit, namely the protection of the building against ground reflections, is achieved as regards the reflected portion of the radiation, which may be not inconsiderable. Moreover, that part of the radiation emitted by the window and striking the parabolic surface is also partially reflected outwards. In this way, notwithstanding the transparency of the plate, the unit retains a certain degree of effectiveness.

This effectiveness is comparable to that of a unit with a reflecting parabolic surface, if, instead of using any transparent plate whatever, the plate employed is transparent to visible light, but reflects infrared rays. Such plates exist. Some of them consist of one or more transparent materials—glass, for example—containing, or faced on one side with, a very thin sheet of aluminium, which allows visible light to pass through but reflects infra-red rays.

One might even consider making the window and the member with the parabolic surface from a single plate of transparent materials. Such a plate would have to reflect infra-red rays from its parabolic portion, but allow them to pass through its window portion.

APPLICATIONS

Conditioning the air in a building, workshop, hall, etc.

Cooling the cold source of a heat engine or the heat source of a refrigerating machine. The sources to be cooled, consisting of tubes or plates, for example, are placed opposite the window or windows of a small building with isothermal reflecting walls.

Water condensation in arid countries. A north-facing wall is formed from one or more units. It may be inclined southwards. The window or windows are closed with a film or sheet of glass, polyethylene or other plastics. Emitter plates radiate towards the windows. They may have reflecting properties or be faced with isothermal material on the side opposite the window. The walls of the building have reflecting and isothermal properties. The water condensing on the plates falls into a small gutter leading to a tank. The natural air circulation due to differences in temperature is limited to a small flow, which may pass into a heat exchanger at the inlet and outlet.

Cooling of a cold-store room. The unit could be disposed in a plane parallel to the earth's equatorial plane, such an arrangement making it possible to use units with large windows. This plane may be represented by a roof surface in a temperate country. The widened-out portion would be protected against inclement weather by a plate which allowed infra-red rays to pass. The functioning of a unit disposed in this way appears to be problematical in summer, when its widened-out portion receives the sun all day. However, the emissive portion (cold-room and window) can be separated from the widened-out portion by a sheet of polyethylene, for example, fitted to the window.

Reliable production of cold on the moon, both during the long, hot lunar day and during the night.

*Further Application*

Placed in an east or west wall, the unit allows the sun to enter during part of the morning and evening, but protects the building against ground reflections. A movable panel can be fitted, to enable the window of the unit to be closed while the sun is shining hotly upon it.

I claim:

1. A constructional unit for cooling a building having an external shape substantially that of a parallelepiped comprising a base, a front opening above said base having convergent reflector sides and an inclined lower wall; an orifice inwardly of said front opening having a rectangular configuration open to the base and the rear through which heat radiations emitted by the interior of said building takes place towards the outside and a parabolic shaped reflective surface extending from said front opening to said orifice to protect said orifice from the midday sun, said convergent reflector sides of said front opening protecting said orifice from the morning and afternoon sun.

2. A constructional unit according to claim 1 wherein said parabolic surface has as its generating line a straight line perpendicular to the meridian plane and as its directrix a parabolic segment contained within the meridian plane and having as its axis the intersection of the said meridian plane with a perpendicular plane.

3. A constructional unit according to claim 1 wherein said unit is made of a material of low thermal conductivity.

4. A constructional unit according to claim 1 in which a lower portion of said parabolic surface is removed to provide a line of vision from the interior to the outside.

5. A constructional unit acording to claim 1 wherein said inner opening is blocked by a sheet of a material which will pass heat radiation received from inside the building.

6. A constructional unit according to claim 5 in which said sheet is coated with paint on its inner surface, said paint being non-reflecting to the radiation emitted from inside the building.

References Cited

UNITED STATES PATENTS

| | | | |
|---|---|---|---|
| 2,069,268 | 2/1937 | Otto | 52—202 |
| 2,261,011 | 10/1941 | Wiley | 52—307 |
| 2,613,402 | 10/1952 | Gouge | 52—202 |
| 2,935,769 | 5/1960 | Lutes | 52—202 |
| 783,448 | 2/1905 | Merrill | 52—606 |
| 1,981,327 | 11/1934 | Rimmer | 52—97 |
| 2,006,648 | 7/1935 | Nobbs | 350—264 |
| 2,327,918 | 8/1943 | Miller | 165—133 X |
| 2,625,930 | 1/1953 | Harris. | |
| 2,641,953 | 6/1953 | McCormick | 350—284 |
| 3,001,331 | 9/1961 | Brunton. | |
| 3,043,112 | 7/1962 | Head. | |

FOREIGN PATENTS

| | | |
|---|---|---|
| 518,333 | 5/1921 | France. |
| 1,359,216 | 3/1964 | France. |
| 1,235,000 | 5/1960 | France. |

HENRY C. SUTHERLAND, *Primary Examiner.*

FRANK L. ABBOTT, *Examiner.*

M. O. WARNECKE, *Assistant Examiner.*